United States Patent Office 3,542,832
Patented Nov. 24, 1970

3,542,832
HIGHER ALKYL CONTAINING ACETOXYSILANES
Charles A. Roth, Saginaw, Mich., assignor to Dow Corning Corporation, Midland, Mich., a corporation of Michigan
No Drawing. Filed Aug. 15, 1968, Ser. No. 752,780
Int. Cl. C07f 7/08, 7/18
U.S. Cl. 260—448.2
7 Claims

ABSTRACT OF THE DISCLOSURE

Alkylacetoxysilanes wherein the alkyl group contains 12 to 45 carbon atoms are disclosed. The alkylacetoxysilanes include compounds of the formulae

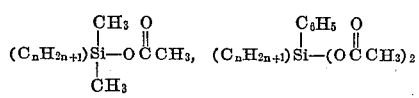

and

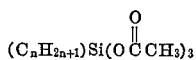

wherein $n$ is 12 to 45 inclusive. The alkylacetoxysilanes are useful as evaporation retardants. Examples of specific alkylacetoxysilanes are octadecyldimethylacetoxysilane, octadecylphenyldiacetoxysilane and octadecyltriacetoxysilane.

---

This invention relates to alkylacetoxysilanes.

Acetoxysilanes are known, such as, those described in U.S. Pat. No. 2,405,988. These acetoxysilanes, such as, dodecyl-di-phenyl-silicon acetate are described and are useful as treating agents to make cellulosic materials water repellent.

An object of this invention is to provide a new class of alkyl acetoxysilanes which are useful for retarding the evaporation of water.

This invention relates to an alkylacetoxysilane having a formula selected from the group consisting of

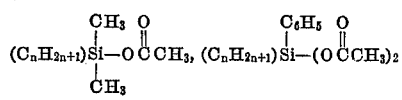

and

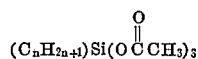

wherein $n$ is an integer of from 12 to 45 inclusive.

The alkylacetoxysilanes of this invention can best be prepared by reacting an α-olefin with a chlorosilane in the presence of a platinum catalyst such as chloroplatinic acid. The chlorosilanes needed to provide the alkylacetoxysilanes of the present invention are dimethylmonochlorosilane, monophenyldichlorosilane and trichlorosilane. An α-olefin and dimethylmonochlorosilane react to provide a compound having a formula

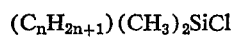

An α-olefin and monophenyldichlorosilane react to provide a compound having a formula

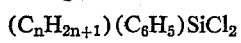

An α-olefin and trichlorosilane react to provide a compound having a formula $(C_nH_{2n+1})SiCl_3$. The resulting chlorosilanes are then reacted with sodium acetate to produce the corresponding alkylacetoxysilane of the present invention. Another method of preparing the compounds of this invention is reacting the appropriate chlorosilane with acetic anhydride.

The α-olefin can be any alkene which has a carbon-carbon double bond at a terminal carbon atom and has 12 to 45 carbon atoms. The α-olefin can be either straight chained or branched and include, for example, α-dodecene, α-tridecene, α-tetradecene, α-pentadecene, α-hexadecene, α-octadecene, α-nonadecene,

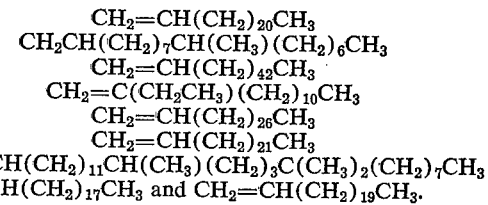

$CH_2=CH(CH_2)_{17}CH_3$ and $CH_2=CH(CH_2)_{19}CH_3$.

The alkylacetoxysilanes having a formula

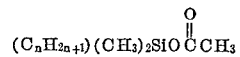

include, for example, n-dodecyldimethylacetoxysilane,
n-tridecyldimethylacetoxysilane,
n-tetradecyldimethylacetoxysilane,
n-hexadecyldimethylacetoxysilane,
n-octadecyldimethylacetoxysilane,
n-eicosyldimethylacetoxysilane,
n-tetracosyldimethylacetoxysilane,
n-triacontyldimethylacetoxysilane,
n-tetracontyldimethylacetoxysilane,

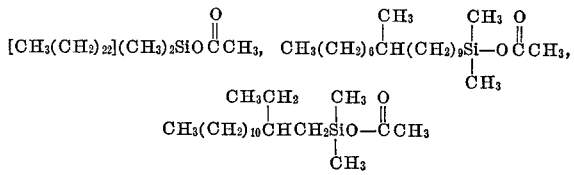

and

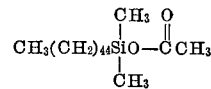

The alkylacetoxysilanes having a formula

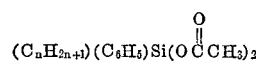

include, for example, n-dodecylphenyldiacetoxysilane,
n-tetradecylphenyldiacetoxysilane,
n-pentadecylphenyldiacetoxysilane,
n-hexadecylphenyldiacetoxysilane,
n-heptadecylphenyldiacetoxysilane,
n-octadecylphenyldiacetoxysilane,
n-eicosylphenyldiacetoxysilane,
n-docosylphenyldiacetoxysilane,
n-hexacosylphenyldiacetoxysilane
n-hentriacontylphenyldiacetoxysilane,
n-pentatetracontylphenyldiacetoxysilane,

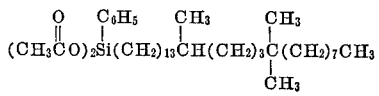

and

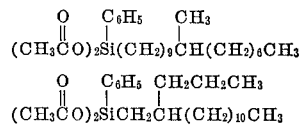

The alkylacetoxysilanes having a formula $$(C_nH_{2n+1})Si(O\overset{O}{\underset{\|}{C}}CH_3)_3$$

include, for example,
n-dodecyltriacetoxysilane,
n-tridecyltriacetoxysilane,
n-tetradecyltriacetoxysilane,
n-hexadecyltriacetoxysilane,
n-heptadecyltriacetoxysilane,
n-octadecyltriacetoxysilane,
n-eicosyltriacetoxysilane,
n-heneicosyltriacetoxysilane,
n-docosyltriacetoxysilane,
n-hexacosyltriacetoxysilane,
n-nonacosyltriacetoxysilane,
n-dotriacontyltriacetoxysilane,
n-pentatetracontyltriacetoxysilane, $$CH_3(CH_2)_7(CH_3)_2C(CH_2)_3CH(CH_3)(CH_2)_{13}Si(OOCCH_3)_3,$$

$$CH_3(CH_2)_6CH(CH_3)(CH_2)_9Si(OOCCH_3)_3$$

and $$CH_3(CH_2)_{10}CH(CH_2CH_3)CH_2Si(OOCCH_3)_3$$

The alkylacetoxysilanes of the present invention are particularly useful as evaporation retardants. The alkylacetoxysilanes are applied to the surface of an aqueous body which is exposed to a gaseous atmosphere. The amount of alkylacetoxysilane applied is determined by several factors, such as, temperature of the aqueous body, temperature of the atmosphere above the aqueous body and the movement of the atmosphere or the aqueous body. The amount of the alkylacetoxysilane is usually applied to provide at least a monomolecular layer on the aqueous surface. However, more or less can be used depending upon the desired results. If one desires to control the rate of evaporation, one can apply less of the alkylacetoxysilane to provide some specific rate of evaporation which can be used as a means of controlling the temperature of an aqueous body.

The aqueous body can be a swamp, a field covered with water, a pond, a lake, a reservoir, or in a tank, in a ditch, in a dish, in a closed container with a controlled atmosphere and the like.

The alkylacetoxysilanes can be applied to the aqueous body as is or in the form of an organic solution or by any other means suitable to disperse the compound over the aqueous surface.

The alkylacetoxysilanes of the present invention retard the evaporation of water. The most effect alkylacetoxysilanes useful as evaporation retardants are those having a formula $(C_nH_{2n+1})(CH_3)_2Si(OOCCH_3)$.

The following examples are illustrative only and should not be construed as limiting the invention which is properly delineated in the appended claims.

EXAMPLE 1

A liter flask was charged with 252 g. of octadecene-1 and heated to 110° C. To the heated octadecene-1 was added 110 g. of dimethylmonochlorosilane and 0.15 cc. of chloroplatinic acid. The reaction was exothermic and the temperature rose to 128° C. and was held there for one-half hour. The excess dimethylmonochlorosilane was removed by heating the mixture. The product showed no silicon bonded hydrogen atoms when an infrared spectrum was obtained. The product obtained was $(C_{18}H_{37})(CH_3)_2SiCl$.

A vapor phase chromatogram was run on the product and a small amount of octadecene-1 was still unreacted. The product was then heated to 120° C. and 50 g. of dimethylmonochlorosilane and 0.10 cc. of chloroplatinic acid was added. The reaction mixture was refluxed. The excess dimethylmonochlorosilane which was 45 g. was removed.

A flask was charged with 104.1 g. of the octadecyldimethylchlorosilane prepared above and was heated to 60° C. 32.13 g. of acetic anhydride was then slowly added to the heated mixture. After the acetic anhydride was added and the mixture was heated at 60° C. for one-half hour. The reacted mixture was then stripped under reduced pressure (about 160 mm. of Hg) at 100° C. to remove the acetyl chloride which formed. The product was obtained was $$(C_{18}H_{37})(CH_3)_2Si(O\overset{O}{\underset{\|}{C}}CH_3)$$

EXAMPLE 2

A 250 ml. flask was charged with 150 cc. of acetic acid and 16.4 g. of sodium acetate. The mixture was stirred until the sodium acetate dissolved. At room temperature, 41.6 g. of $(C_{18}H_{37})(CH_3)_2SiCl$ was added to the sodium acetate solution, resulting in a two phase system. The mixture was then stirred and a white solution resulted. The mixture was stirred for 6 hours. The resulting product was $$(C_{18}H_{37})(CH_3)_2SiO\overset{O}{\underset{\|}{C}}CH_3$$

in a yield of 44.5 g.

EXAMPLE 3

A flask was charged with 242 g. of mixture of α-olefins. The α-olfin mixture contained α-olefins having from 15 to 20 carbon atoms per molecule and the average molecular weight of the mixture was 242. To the mixture of α-olefins, 159.3 g. of $(C_6H_5)HSiCl_2$ was added, the mixture being under a nitrogen atmosphere. The resulting mixture was heated to 120° C. and 0.1 ml. of chloroplatinic acid was added. The temperature of the reaction mixture was maintained between 120° C. and 140° C. for one hour. The resulting mixture was then stripped to 160° C. at about 1 mm. of Hg pressure to remove any unreacted materials. The product obtained was $(C_pH_{2p+1})(C_6H_5)SiCl_2$ where $p$ is 15 to 20 in a yield of 273.1 g.

In a 100 ml. flask, 8.6 g. of sodium acetate was dissolved in 55 cc. of acetic acid and then 24 g. of the $(C_pH_{2p+1})(C_6H_5)SiCl_2$ prepared above was added. A white precipitate formed immediately. The mixture was stirred for 7 hours. A three phase system resulted. The top phase of the three phase system was the product phase. The bottom liquid phase was acetic acid and sodium acetate and the bottom solid phase was sodium chloride. The mixture was separated by filtering, decanting and the product phase was stripped to remove any impurities. The product was obtained in a yield of 10.7 g. and was $$(C_pH_{2p+1})(C_6H_5)Si(O\overset{O}{\underset{\|}{C}}CH_3)_2$$

where $p$ was 15 to 20 inclusive. The melting point was 24° C.

EXAMPLE 4

A 500 ml. flask was charged with 266 g. of the α-olefin mixture as described in Example 3 and was then heated to 125° C. To the heated α-olefin mixture, 100 ml. of trichlorosilane and 0.25 ml. of chloroplatinic acid were added. The mixture was maintained between 100° C. to 150° C. for one hour. The resulting product was stripped at less than 1 mm. of Hg up to a pot temperature of 190° C. The resulting product was obtained in a yield of 297 g. and was $(C_pH_{2p+1})SiCl_4$ where $p$ was 15 to 20 inclusive.

In a 300 ml. flask, 25.8 g. of sodium acetate was added and then dissolved in 150 ml. of acetic acid. The solution was stirred and then 47.9 g. of the $(C_pH_{2p+1})SiCl_3$ prepared above was added. The resulting mixture was stirred for 3 hours and then the product was separated as described in Example 3. The product was obtained in a yield of 20.8 g. and was $$(C_pH_{2p+1})Si(O\overset{O}{\underset{\|}{C}}CH_3)_3$$

where p was 15 to 20 inclusive. The product had a melting point of 47° C.

EXAMPLE 5

A solution of each of the alkylacetoxysilane products of Examples 2, 3 and 4 in diethylether was prepared. Ten drops of each ether solution was placed on the surface of 100 g. of tap water in 250 ml. stainless steel cups. The resulting assemblies were placed in a controlled atmosphere of 65% relative humidity and 68° F. The weight of the cup, water and ether solution was initially made and then observed at time intervals of 1 day, 2 days, 5 days and 7 days. A control cup was also placed in the controlled atmosphere. The control was prepared as above, but without the alkylacetoxysilane solution. The octadecyldimethylacetoxysilane of Example 2 was prepared in a 4 weight percent ether solution and the alkylacetoxysilanes of Examples 3 and 4 were prepared in 10 weight percent ether solutions. A 4 weight percent ether solution of octadecyldimethylsilanol was used in place of the octadecyldimethylacetoxysilane. This was used as a comparison to show the unique properties of the alkylacetoxysilanes.

The results below are the weight percentages of water lost in a given period under the test conditions.

| Olefin | Product |
|---|---|
| $CH_2=CH(CH_2)_{26}CH_3$ | $CH_3\overset{O}{\underset{\|}{C}}O\underset{\underset{CH_3}{\|}}{\overset{\overset{CH_3}{\|}}{Si}}(CH_2)_{28}CH_3$ |
| $CH_2=CH(CH_2)_9CH_3$ | $CH_3\overset{O}{\underset{\|}{C}}O\underset{\underset{CH_3}{\|}}{\overset{\overset{CH_3}{\|}}{Si}}(CH_2)_{11}CH_3$ |
| $CH_2=CH(CH_2)_{13}CH_3$ | $CH_3\overset{O}{\underset{\|}{C}}O\underset{\underset{CH_3}{\|}}{\overset{\overset{CO_3}{\|}}{Si}}(CH_2)_{15}CH_3$ |
| $CH_2=CH(CH_2)_{42}CH_3$ | $CH_3\overset{O}{\underset{\|}{C}}O\underset{\underset{CH_3}{\|}}{\overset{\overset{CH_3}{\|}}{Si}}(CH_2)_{44}CH_3$ |
| $CH_2=\underset{\underset{CH_2CH_3}{\|}}{C}(CH_2)_{10}CH_3$ | $CH_3\overset{O}{\underset{\|}{C}}O\underset{\underset{CH_3}{\|}}{\overset{\overset{CH_3}{\|}}{Si}}CH_2\underset{\underset{CH_2CH_3}{}}{\overset{}{C}H}(CH_2)_{10}CH_3$ |
| $CH_2=CH(CH_2)_7\underset{\underset{CH_3}{\|}}{\overset{\overset{CH_3}{\|}}{C}H}(CH_2)_6CH_3$ | $CH_3\overset{O}{\underset{\|}{C}}O\underset{\underset{CH_3}{\|}}{\overset{\overset{CH_3}{\|}}{Si}}(CH_2)_9\underset{\underset{}{}}{\overset{\overset{CH_3}{\|}}{C}H}(CH_2)_6CH_3$ |

| Compound | Percent water loss after— | | | | Percent savings over control |
|---|---|---|---|---|---|
|  | 1 day | 2 days | 5 days | 7 days |  |
| (1) Control | 7.3 | 14.7 | 35.0 | 47.2 | |
| (2) $C_{18}H_{37}\underset{\underset{CH_3}{\|}}{\overset{\overset{CH_3}{\|}}{Si}}O-\overset{O}{\underset{\|}{C}}CH_3$ | 1.3 | 2.3 | 8.2 | 18.2 | 61.4 |
| (3) $C_{15-20}H_{31-41}\underset{}{\overset{\overset{C_6H_5}{\|}}{Si}}-(O\overset{O}{\underset{\|}{C}}CH_3)_2$ | 6.5 | 13.9 | 31.7 | 43.1 | 8.7 |
| (4) $C_{15-20}H_{31-41}Si(O\overset{O}{\underset{\|}{C}}CH_3)_3$ | 6.6 | 14.0 | 31.4 | 44.0 | 6.8 |
| (5) $C_{18}H_{37}\underset{\underset{CH_3}{\|}}{\overset{\overset{CH_3}{\|}}{Si}}OH$ | 7.1 | 16.5 | 37.4 | 50.1 | −6.1 |

EXAMPLE 6

When the following olefins are reacted with $(CH_3)_2HSiCl$ in the presence of chloroplatinic acid and then contacted with sodium acetate as described in Example 2, the products as shown in the following table are obtained.

EXAMPLE 7

When the following olefins are reacted with $(C_6H_5)HSiCl_2$ in the presence of chloroplatinic acid and then contacted with sodium acetate as described in Example 3, the products as shown in the following table are obtained.

| Olefin | Product |
|---|---|
| $CH_2=CH(CH_2)_{23}CH_3$ | $(CH_3\overset{O}{\underset{\|}{C}}O)_2\underset{\underset{}{}}{\overset{\overset{C_6H_5}{\|}}{Si}}(CH_2)_{25}CH_3$ |
| $CH_2=CH(CH_2)_{29}CH_3$ | $(CH_3\overset{O}{\underset{\|}{C}}O)_2\underset{\underset{}{}}{\overset{\overset{C_6H_5}{\|}}{Si}}(CH_2)_{31}CH_3$ |
| $CH_2=CH(CH_2)_9CH_3$ | $(CH_3\overset{O}{\underset{\|}{C}}O_2\underset{\underset{}{}}{\overset{\overset{C_6H_5}{\|}}{Si}}(CH_2)_{11}CH_3$ |
| $CH_2=CH(CH_2)_{19}CH_3$ | $(CH_3\overset{O}{\underset{\|}{C}}O)_2\underset{\underset{}{}}{\overset{\overset{C_6H_5}{\|}}{Si}}(CH_2)_{21}CH_3$ |
| $CH_2=CH(CH_2)_{42}CH_3$ | $(CH_3\overset{O}{\underset{\|}{C}}O)_2\underset{\underset{}{}}{\overset{\overset{C_6H_5}{\|}}{Si}}(CH_2)_{44}CH_3$ |
| $CH_2=CH(CH_2)_{11}\underset{\underset{CH_3}{\|}}{\overset{\overset{CH_3}{\|}}{C}H}(CH_2)_3\underset{\underset{CH_3}{\|}}{\overset{\overset{CH_3}{\|}}{C}}(CH_2)_7CH_3$ | $(CH_3\overset{O}{\underset{\|}{C}}O_2)\underset{\underset{}{}}{\overset{\overset{C_6H_5}{\|}}{Si}}(CH_2)_{13}\underset{\underset{CH_3}{\|}}{\overset{\overset{CH_3}{\|}}{C}H}(CH_2)_3\underset{\underset{CH_3}{\|}}{\overset{\overset{CH_3}{\|}}{C}}(CH_2)_7CH_3$ |

EXAMPLE 8

When the following olefins are reacted with $HSiCl_3$ in the presence of chloroplatinic acid and then contacted with sodium acetate as described in Example 4, the products as shown in the following table are obtained.

| Olefin | Product |
|---|---|
| $CH_2=CH(CH_2)_9CH_3$ | $(CH_3\overset{O}{\overset{\|}{C}}O)_3Si(CH_2)_{11}CH_3$ |
| $CH_2=CH(CH_2)_{12}CH_3$ | $(CH_3\overset{O}{\overset{\|}{C}}O)_3Si(CH_2)_{14}CH_3$ |
| $CH_2=CH(CH_2)_{26}CH_3$ | $(CH_3\overset{O}{\overset{\|}{C}}O)_3Si(CH_2)_{28}CH_3$ |
| $CH_2=CH(CH_2)_{12}CH_3$ | $(CH_3\overset{O}{\overset{\|}{C}}O)_3Si(CH_2)_{14}CH_3$ |
| $CH_2=CH(CH_2)_{29}CH_3$ | $(CH_3\overset{O}{\overset{\|}{C}}O)_3Si(CH_2)_{31}CH_3$ |
| $CH_2=CH(CH_2)_7\overset{CH_3}{\overset{\|}{C}}H(CH_2)_6CH_3$ | $(CH_3\overset{O}{\overset{\|}{C}}O)_3Si(CH_2)_9\overset{CH_3}{\overset{\|}{C}}H(CH_2)_6CH_3$ |

That which is claimed is:

1. An alkylacetoxysilane having a formula selected from the group consisting of

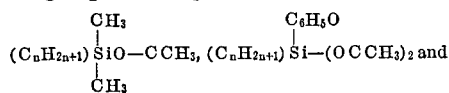

and

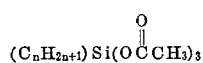

wherein $n$ is an integer of from 12 to 45 inclusive.

2. The alkylacetoxysilane according to claim 1 wherein the formula is

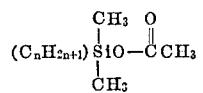

3. The alkylacetoxysilane according to claim 2 wherein $n$ is 18.

4. The alkylacetoxysilane according to claim 1 wherein the formula is

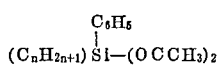

5. The alkylacetoxysilane according to claim 4 wherein $n$ has a value of from 15 to 20 inclusive.

6. The alkylacetoxysilane according to claim 1 wherein the formula is

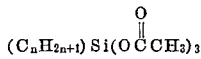

7. The alkylacetoxysilane according to claim 6 wherein $n$ has a value of from 15 to 20 inclusive.

References Cited

UNITED STATES PATENTS 2,405,988   8/1946   Barry.

TOBIAS E. LEVOW, Primary Examiner

P. F. SHAVER, Assistant Examiner

U.S. Cl. X.R.

260—448